US007216293B2

(12) United States Patent
Kataoka et al.

(10) Patent No.: US 7,216,293 B2
(45) Date of Patent: May 8, 2007

(54) DISPLAY CONTROL METHOD, PROGRAM PRODUCT, AND INFORMATION PROCESSING APPARATUS FOR CONTROLLING OBJECTS IN A CONTAINER BASED ON THE CONTAINER'S SIZE

(75) Inventors: Katsuhisa Kataoka, Sagamihara (JP); Naoko Itoh, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 10/388,709

(22) Filed: Mar. 14, 2003

(65) Prior Publication Data

US 2003/0210268 A1 Nov. 13, 2003

(30) Foreign Application Priority Data

Mar. 15, 2002 (JP) ............................. 2002-072892

(51) Int. Cl.
*G06F 3/00* (2006.01)

(52) U.S. Cl. ...................... 715/508; 715/517; 715/780; 715/788; 715/800; 715/801

(58) Field of Classification Search ................ 715/800, 715/801
See application file for complete search history.

(56) References Cited

U.S. PATENT DOCUMENTS 5,060,170 A * 10/1991 Bourgeois et al. .......... 715/788
5,760,772 A * 6/1998 Austin ........................ 715/798
5,873,106 A * 2/1999 Joseph ........................ 715/506
6,335,743 B1 * 1/2002 Owings ...................... 715/801
6,392,673 B1 * 5/2002 Andrew et al. ............. 715/800
6,414,698 B1 * 7/2002 Lovell et al. ............... 715/800
6,603,493 B1 * 8/2003 Lovell et al. ............... 715/800
6,750,887 B1 * 6/2004 Kellerman et al. ......... 715/788
6,950,993 B2 * 9/2005 Breinberg ................... 715/801
7,093,196 B1 * 8/2006 Griffiths et al. ............. 715/518

FOREIGN PATENT DOCUMENTS

JP 07-244568 9/1995

* cited by examiner

*Primary Examiner*—Tadesse Hailu
*Assistant Examiner*—Alvin H Tan
(74) *Attorney, Agent, or Firm*—Martin J. McKinley; Dillon & Yudell LLP

(57) ABSTRACT

The present invention provides a technique to improve productivity on a task for redesigning a screen depending on change in a display size of the screen displayed on a display unit. In a computer environment, a display of a screen composed of a container for defining a frame of the screen and a GUI part arranged in this container is controlled as follows. When an event is detected for changing the size of the screen displayed on a display section, the size of the container in this screen is changed according to the detected event. Furthermore, data relating to a GUI part arranged within the container are changed on the basis of transformation assist lines 341 and 342 set on the container. Then the changed size of the container, a position and the size of the GUI part are reflected to update the screen.

18 Claims, 15 Drawing Sheets

FIG. 9

CONTAINER INFORMATION

| | W | H |
|---|---|---|
| CONTAINER | 560 | 370 |

PART ARRANGEMENT INFORMATION

| GUI PARTS | X | Y | W | H |
|---|---|---|---|---|
| FURIGANA (LABEL 311) | 40 | 40 | 100 | 30 |
| NAME (LABEL 312) | 40 | 80 | 100 | 30 |
| ZIP CODE (LABEL 313) | 40 | 120 | 100 | 30 |
| ADDRESS (LABEL 314) | 40 | 160 | 100 | 30 |
| TELEPHONE NUMBER (LABEL 315) | 40 | 200 | 100 | 30 |
| COMMENT (LABEL 316) | 40 | 240 | 100 | 30 |
| | | | | |
| FURIGANA (INPUT FIELD 321) | 140 | 20 | 200 | 30 |
| NAME (INPUT FIELD 322) | 140 | 40 | 200 | 30 |
| ZIP CODE (INPUT FIELD 323) | 140 | 80 | 90 | 30 |
| ADDRESS (INPUT FIELD 324) | 140 | 120 | 280 | 30 |
| TELEPHONE NUMBER (INPUT FIELD 325) | 140 | 160 | 280 | 30 |
| COMMENT (INPUT FIELD 326) | 140 | 200 | 320 | 100 |
| | | | | |
| OK (BUTTON 331) | 440 | 30 | 90 | 30 |
| CANCEL (BUTTON 332) | 440 | 70 | 90 | 30 |

TRANSFORMATION ASSIST LINE INFORMATION

| | TYPE | POSITION |
|---|---|---|
| TRANSFORMATION ASSIST LINE 341 | VERTICAL | X=380 |
| TRANSFORMATION ASSIST LINE 342 | HORIZONTAL | Y=260 |

FIG. 10

CONTAINER INFORMATION

| | W | H |
|---|---|---|
| CONTAINER | 740 | 520 |

PART ARRANGEMENT INFORMATION

| GUI PARTS | X | Y | W | H |
|---|---|---|---|---|
| FURIGANA (LABEL 311) | 40 | 40 | 100 | 30 |
| NAME (LABEL 312) | 40 | 80 | 100 | 30 |
| ZIP CODE (LABEL 313) | 40 | 120 | 100 | 30 |
| ADDRESS (LABEL 314) | 40 | 160 | 100 | 30 |
| TELEPHONE NUMBER (LABEL 315) | 40 | 200 | 100 | 30 |
| COMMENT (LABEL 316) | 40 | 240 | 100 | 30 |
| | | | | |
| FURIGANA (INPUT FIELD 321) | 140 | 20 | 200 | 30 |
| NAME (INPUT FIELD 322) | 140 | 40 | 200 | 30 |
| ZIP CODE (INPUT FIELD 323) | 140 | 80 | 90 | 30 |
| ADDRESS (INPUT FIELD 324) | 140 | 120 | 460 | 30 |
| TELEPHONE NUMBER (INPUT FIELD 325) | 140 | 160 | 460 | 30 |
| COMMENT (INPUT FIELD 326) | 140 | 200 | 500 | 250 |
| | | | | |
| OK (BUTTON 331) | 620 | 30 | 90 | 30 |
| CANCEL (BUTTON 332) | 620 | 70 | 90 | 30 |

DISPLAY CONTROL METHOD, PROGRAM PRODUCT, AND INFORMATION PROCESSING APPARATUS FOR CONTROLLING OBJECTS IN A CONTAINER BASED ON THE CONTAINER'S SIZE

BACKGROUND OF THE INVENTION

1. Field of the Invention

The present invention relates to a display control technique for a screen to be displayed on a display unit of a computer system or the like. More particularly, the present invention relates to a technique for controlling a design of a screen on a display in the situation where the size of the screen is changed.

2. Description of the Related Art

A common type of a user interface utilized by a computer based systems includes a combination of input fields for inputting text and the like and labels for providing explanations for information to be inputted to the above-described input fields. For user interfaces utilized by business applications, the combination of the labels and their corresponding input fields is often arranged very closely. Therefore, an operating efficiency for determining the arrangement of such labels fields has a great effect on the productivity on graphical user interface or screen development for business applications.

FIG. 15 shows an example input screen having combinations of labels and input fields. As shown in FIG. 15, the input screen includes an arrangement of rectangular GUI parts in a predetermined rectangular container 1500. The container 1500 defines an outer frame of the input screen. FIG. 15 shows such GUI parts as labels 1501, input fields 1502 and buttons 1503 for inputting a command. It should be noted that although the labels 1501 are shown as text only in the container 1500, they are treated as being text labels within rectangles having the same color as the adjoining areas of the container 1500.

In FIG. 15, the arrangement position of each GUI part is specified in the container 1500 using corrdinate values. The values include the X-Y coordinates of a predetermined position of the rectangle (for example, a left upper vertex or the like), and the width (W) and the height (H) of the rectangle. Hereinafter these parameters are denoted collectively as XYWH.

Generally, an image prepared with the GUI may be changed in its display size or its display position on a display screen on the display unit of the computer. In the input screen shown in FIG. 15, if the display size of the container 1500 is changed, it is required to appropriately change the display positions of the labels 1501 and/or the buttons 1503, the display size of the input fields 1502 and the like depending on a new display size after the change to keep the balance of the whole screen. For changing the display of the labels 1501, the input fields 1502 and the buttons 1503, tools are generally prepared in software for developing such a screen, for example, GirdBagLayout and the like are used in Java®. Java is a trademark of Sun Microsystems.

In a development process for a business application, when a user interface screen is designed, the sizes and the arrangement of the above described container and the GUI parts are determined by trial and error. However, if the display size of the container is changed (expanded), there are many considerations to be taken into account. These include which part should be extended in the screen, how the display sizes or the arrangement of the GUI parts should be changed, etc. Considering these possibilities reduces developer productivity when designing the screen.

Furthermore, since the display sizes and the display positions of the GUI parts are specified with values of XYWH, it is a cumbersome and complicated task to reflect intuitively selected display sizes and arrangements on the actual screen. Therefore, performing this the task is largely inefficient.

In addition, tools for Visual Basic of Microsoft Corporation and the like include a function for changing the sizes and arrangements of the parts within the container relatively in response to a change in the size of the container. However, in this case, the characters of the labels and the characters to be inputted in the input fields are simply enlarged relative to the size of the container. Therefore, it is not preferable to use the function to change the arrangements of the GUI parts depending on the change in the display size of the container to maintain the balance of the whole screen.

SUMMARY OF THE INVENTION

Therefore, it is an object of the present invention to improve the productivity involved with redesigning the screen depending on the change in the display size of the screen, in the screen design of the user interface.

Also, it is another object of the present invention to realize a display control method in which the intuitively selected display sizes or arrangements may be easily reflected on the actual screen.

In order to achieve the above described objects, the present invention is realized as a display control method as will be described, for using a computer to control a display of a screen composed of a container for defining a frame of the screen and a GUI part arranged in this container. That is, this display control method is characterized by including the steps of detecting an event for changing the size of the above described screen displayed on a display unit; changing data relating to the size of the container in this screen, according to the detected event; changing data relating to a position and the size of the GUI part arranged within the container on the basis of a transformation assist line preset on the container; and reflecting the data relating to the changed size of the container, the position and the size of the GUI part to update the screen.

In this display control method, when the data relating to the GUI part is changed, more particularly, the position data of the GUI part is changed depending on its positional relation to this transformation assist line. Then, the size data of the GUI part, on which the transformation assist line is set, is changed depending on a variation in the size of the above described screen in a direction orthogonal to this transformation assist line.

Alternatively, when the data relating to the GUI part is changed, a variation in the size of the container is reflected on a distance of each vertex in a rectangle forming the GUI part, with respect to the transformation assist line.

With these processes, it may be possible to appropriately control the arrangement of the GUI part based on the transformation assist line.

In addition, when the data relating to the GUI part is changed, it is preferable to calculate the position and the size of the GUI part after the change on the basis of the position and the size of the GUI part in the screen in the case where the container has the smallest size, based on a difference between the size of the container after the change and the smallest size.

Therefore, whenever the size of the screen is changed, the arrangement of the GUI part may be controlled by comparing it with the screen of the smallest size, thereby the process is simplified and a process cost may be reduced.

In addition, a plurality of transformation assist lines may be provided with respect to variations in the same direction. In this case, variations in the position and the size of the GUI part are determined depending on the number of the transformation assist lines to be the basis for the variations in the same direction. Each transformation assist line may be weighted to reflect it on the variations in the position and the size of the GUI part, or simply, an amount of the variation in the size of the screen divided by the number of the transformation assist lines may be assigned as the variations in the position and the size of the GUI part with respect to each transformation assist line.

In addition, another display control method according to the present invention is characterized by including the steps of: detecting an event for changing the size of a screen displayed on a display unit; changing data relating to the size of a container in this screen, according to the detected event; changing data relating to a position and the size of a GUI part arranged within the container by calculating a volume for each region, which is formed by separating this container, to be moved; and reflecting the data relating to the changed size of the container, the position and the size of the GUI part to update the screen.

More preferably, when the GUI part is moved, this display control method further includes the step of changing the size of the GUI part spanning a plurality of regions, depending on this volume for each region to be moved.

In addition, when the GUI part is moved, more particular, the display control method includes the step of changing a coordinate value of each vertex in a rectangle forming the GUI part, with respect to the container, depending on the movement of each region in which each vertex is positioned.

Furthermore, the present invention may be realized as a program for controlling a computer to perform the process corresponding to each step of the above described display control methods. This program may be provided by storing it in a magnetic disk, an optical disk, a semiconductor memory, or other storage medium for distribution, or delivering it via a network.

In addition, another present invention for achieving the above described objects may be realized as an information processing apparatus configured as will be described. That is, this information processing apparatus is provided with a display section for displaying a predetermined screen; an arrangement control section for generating data of the screen to be displayed on the display section by arranging a GUI part in a container for defining an outer frame of the screen; and an event detection section for detecting an event for transforming the screen. This arrangement control section is characterized by controlling a position and the size of the GUI part such that the size of this screen in a vertical direction or a horizontal direction, or the sizes of the both directions are changed depending on the detected event, in a portion of a transformation assist line preset on the screen.

This information processing apparatus may be further provided with a basic information storage section for storing information on the above described GUI part in the above described screen of the size for the basis. In this case, the arrangement control section controls the position and the size of the GUI part by processing the information on the GUI part stored in the basic information storage section, based on a difference between the size of the above described screen after the transformation and the size of the screen stored in the basic information storage section.

Furthermore, another information processing apparatus of the present invention is provided with display means for displaying a predetermined screen for providing a user interface, and display control means for controlling the display of the screen to be displayed on the display means. The screen to be displayed on the display means is characterized by being provided with a container for defining an outer frame of the screen, a GUI part to be arranged in this container, and a transformation assist line set on this container. If an operation is performed for changing the size of the container via predetermined input means, this screen is updated by a position and the size of the GUI part being changed on the basis of this transformation assist line.

Here, the screen to be displayed on this display means is provided with a container of a rectangle for defining an outer frame of the screen, and on this container, a transformation assist line going straight to a predetermined side of the container.

BRIEF DESCRIPTION OF THE DRAWINGS

FIG. 9 illustrates data stored in a basic information storage section in the present embodiment;

FIG. 10 shows a predetermined data changed by transforming the designed screen generated based on the data as shown in FIG. 9;

DESCRIPTION OF THE PREFERRED EMBODIMENT

The present invention will be described below in detail based on an embodiment shown in accompanying drawings.

First, a summary of the present invention will be described. The present invention sets a predetermined line (this line is referred to as a transformation assist line) with respect to a rectangle of a container. When the size of the container is changed, an arrangement of a GUI part within the container is changed such that a portion of the above described transformation assist line is changed. For example, if the container is expanded, each GUI part is moved or expanded so that it extends on both sides on the basis of the transformation assist line. Thereby, if the size of the container is changed, the GUI part rearrangement is realized to intuitively compose a modified screen.

Figure 1:
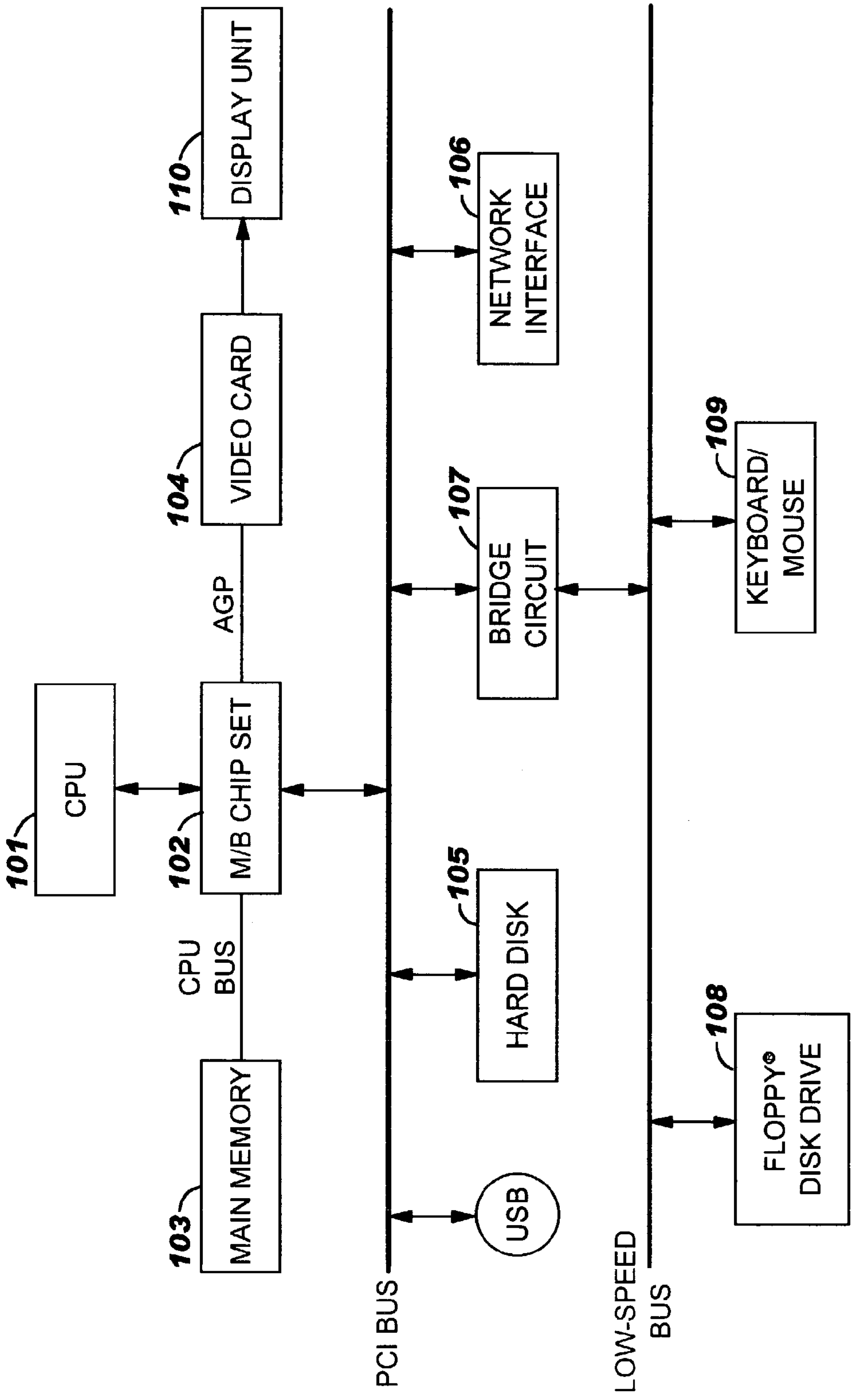
FIG. 1 typically shows an example of a hardware configuration of a computer which is preferable to realize a screen design system according to the present embodiment.

FIG. 1 typically shows an example of a hardware configuration of a computer system which a screen design system according to the present embodiment may be realized.

The computer system as shown in FIG. 1 includes a CPU (Central Processing Unit) 101 as operation means, a main memory 103 connected to the CPU 101 via a M/B (Mother Board) chip set 102 and a CPU bus, a video card 104 similarly connected to the CPU 101 via the M/B chip set 102 and an AGP (Accelerated Graphics Port), a display unit 110 for displaying graphic data generated at the video card 104, a hard disk 105 and a network interface 106 connected to the M/B chip set 102 via a PCI (Peripheral Component Interconnect) bus, and a floppy disk drive 108 and a keyboard/mouse 109 connected to the M/B chip set 102 from this PCI bus via a bridge circuit 107 and a low-speed bus such as an ISA (Industry Standard Architecture) bus. For the display unit 110, for example, a liquid crystal display (LCD) or a CRT display may be used.

It should be noted that FIG. 1 only illustrates a hardware configuration of a computer system for realizing the present embodiment, and other various configurations applicable to the present embodiment may be used. For example, instead of providing the video card 104, only a video memory may be installed to have a configuration for processing image data at the CPU 101, a sound mechanism may be provided for inputting and outputting sounds, or drives for a CD-ROM (Compact Disk Read Only Memory) or a DVD-ROM (Digital Versatile Disc Read Only Memory) may be provided via an interface such as an ATA (AT Attachment).

Figure 2:
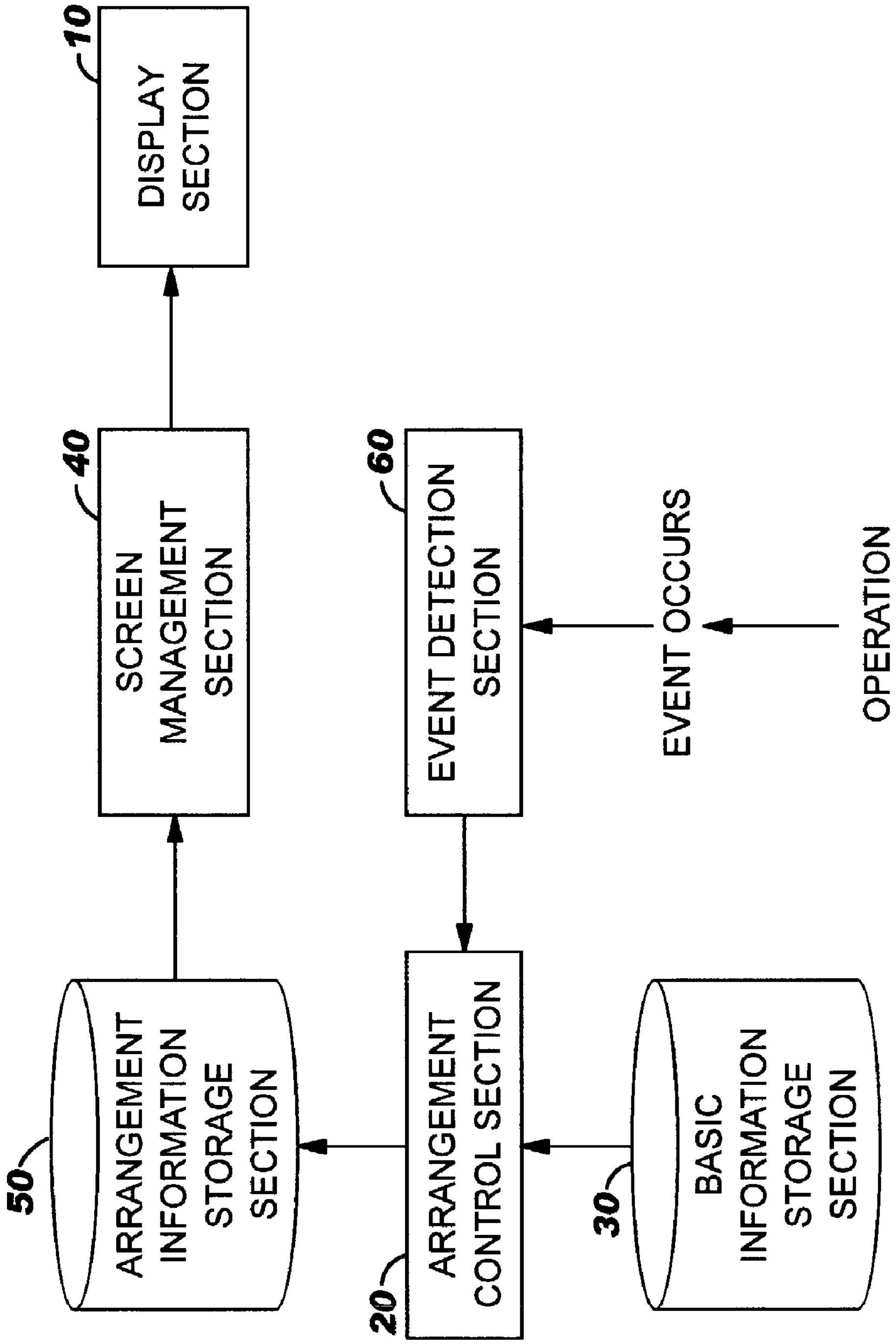
FIG. 2 is a block diagram for explaining functions of the screen design system according to the present embodiment.

FIG. 2 is a block diagram for explaining functions of the screen design system according to the present embodiment.

Referring to FIG. 2, the present embodiment is provided with a display section 10 for displaying the screen to be designed (hereinafter, the designed screen), an arrangement control section 20 for controlling the arrangement of each element in the designed screen (the container and the GUI parts such as labels and input fields to be arranged within the container), a basic information storage section 30 for storing basic information relating to the arrangement of the above described GUI parts, a screen management section 40 and an arrangement information storage section 50 for managing the GUI parts for composing the designed screen to be displayed on the display section 10, and an event detection section 60 for detecting an event which initiates changing the size of the designed screen and rearranging the GUI parts.

In the system configuration as shown in FIG. 2, the display section 10 is realized with a display screen of the display unit 110 for displaying the graphic data of the designed screen generated at the video card 104. The arrangement control section 20, the screen management section 40 and the event detection section 60 are software processes which may be carried out by the CPU 101 controlled with a program as shown in FIG. 1. The program for controlling the CPU 101 to realize these functions is stored in a magnetic disk, an optical disk, a semiconductor memory, or other storage medium for distribution, or delivered via a network, to be read in the main memory 103. In addition, the basic information storage section 30 and the arrangement information storage section 50 are realized in the main memory 103. It should be noted that the data or the program stored in the main memory 103 may be saved in a storage device such as the hard disk 105 as necessary.

In the present embodiment, the arrangement control section 20 controls the arrangement of each element which composes the designed screen. That is, the container for defining an outer frame of the designed screen and positions and sizes of various kinds of GUI parts to be arranged within the container are controlled to generate the data of the designed screen. If the size of the designed screen (the size of the container) is changed, the positions and the sizes of the GUI parts within the container are changed depending on the change. A detailed operation of the arrangement control section 20 will be described below. The data of the designed screen generated at the arrangement control section 20 is stored in the arrangement information storage section 50, and managed in the screen management section 40.

The basic information storage section 30 stores the basic information for controlling the arrangement of the elements of the designed screen by the arrangement control section 20. The basic information includes initial values of the size of the designed screen (container) (W, H), initial values of the positions and the sizes of the GUI parts to be arranged within the container (XYWH), and a position of the transformation assist line to be the basis of transformation upon a change in the size of the designed screen. It should be noted that, in the present embodiment, X–Y coordinates for denoting the position of each GUI part denote a position of a left upper vertex in each GUI part with a left upper vertex of the container as an origin.

The screen management section 40 manages the positions and the sizes of the GUI parts to be arranged in the designed screen (which is actually displayed on the display section 10). The data of the positions and the sizes of the GUI parts (XYWH) is generated at the arrangement control section 20, and stored in the arrangement information storage section 50. That is, the screen management section 40 manages the position data (the X coordinate and the Y coordinate) and the size data (W, H) relating to the GUI parts, such as labels and the input fields stored in the arrangement information storage section 50. Based on the managed information, the graphic data of the designed screen is generated by the video card 104 as shown in FIG. 1, and an image of the designed screen is displayed on the display section 10.

The event detection section 60 detects events which change the size of the designed screen and the like, and notifies the arrangement control section 20 that an event has occured. The arrangement control section 20 starts processing in response to the detection of the event. The detected event may be, for example, a user's operation on an input device such as a mouse or a keyboard, or may be part of a process of an application.

Figure 3:
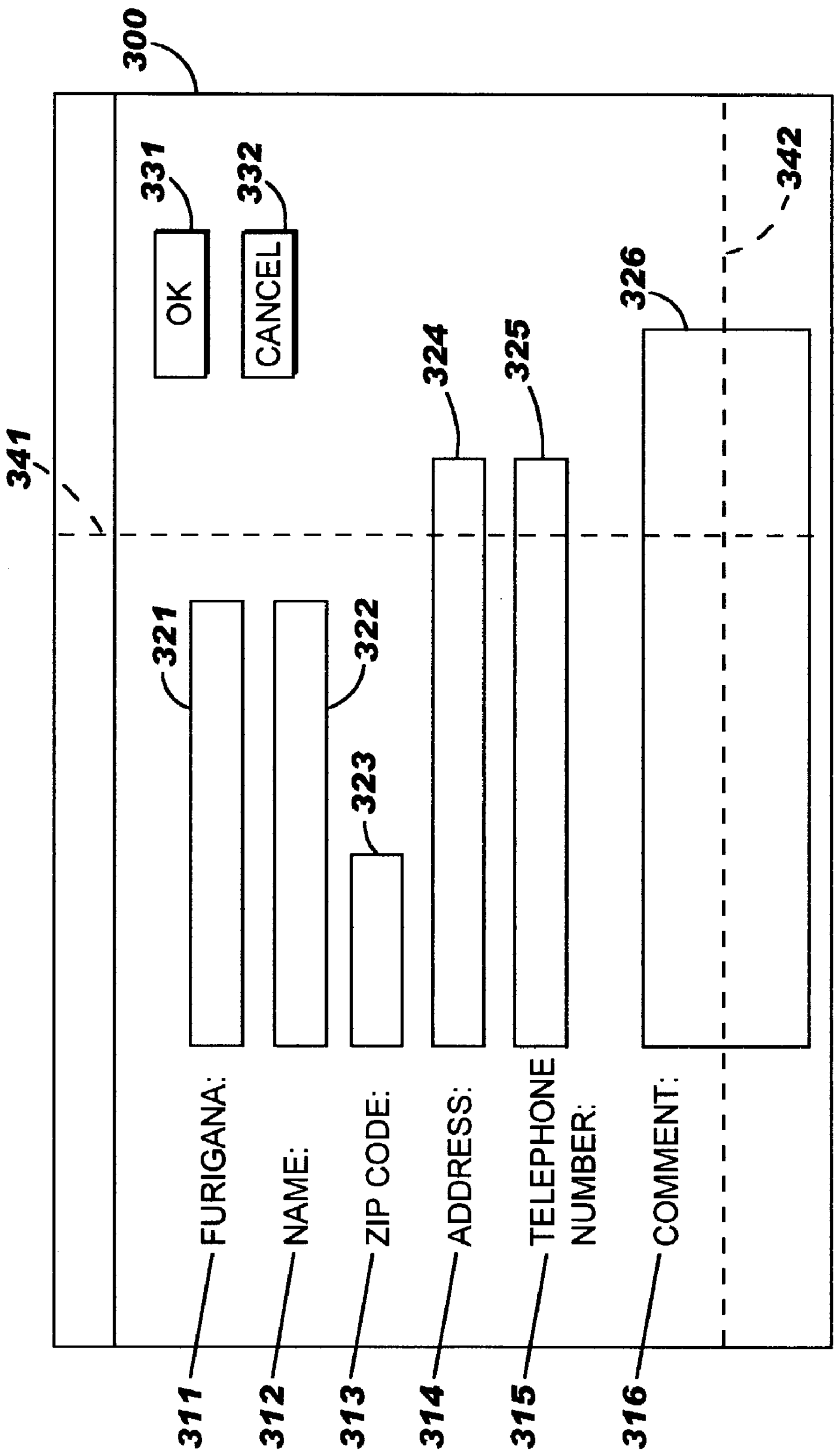
FIG. 3 shows an example of a designed screen displayed on a display section in the present embodiment.

Next, an operation of the present embodiment will be described. FIG. 3 shows an example of the designed screen displayed on the display section 10 in the present embodiment.

Referring to FIG. 3, the designed screen is composed of a container 300, labels 311–316, input fields 321–326 and buttons 331 and 332, which are arranged within the container 300. In addition, in the designed screen, transformation assist lines 341 and 342 are set to be the basis of the transformation of the screen when the size of the screen is changed. The transformation assist lines 341 and 342 are set at predetermined positions on the designed screen, but not displayed.

As shown in FIG. 3, in the designed screen of this type, a small rectangle (each GUI part) is arranged in a large rectangle (container 300). Therefore, the transformation assist lines 341 and 342 are set to go straight vertically and horizontally, and variations in sizes of the container 300 in a vertical direction and a horizontal direction according to the transformation of the designed screen are reflected on distances of four vertexes in each GUI part from the transformation assist lines 341 and 342. Thereby, it is possible to control easily and flexibly how the arrangement and the size of each GUI part are changed depending on the transformation of the designed screen.

When the size of the designed screen as shown in FIG. 3 is changed, the arrangement or the sizes of the GUI parts are changed on the basis of the transformation assist lines 341 and 342.

Figure 4:
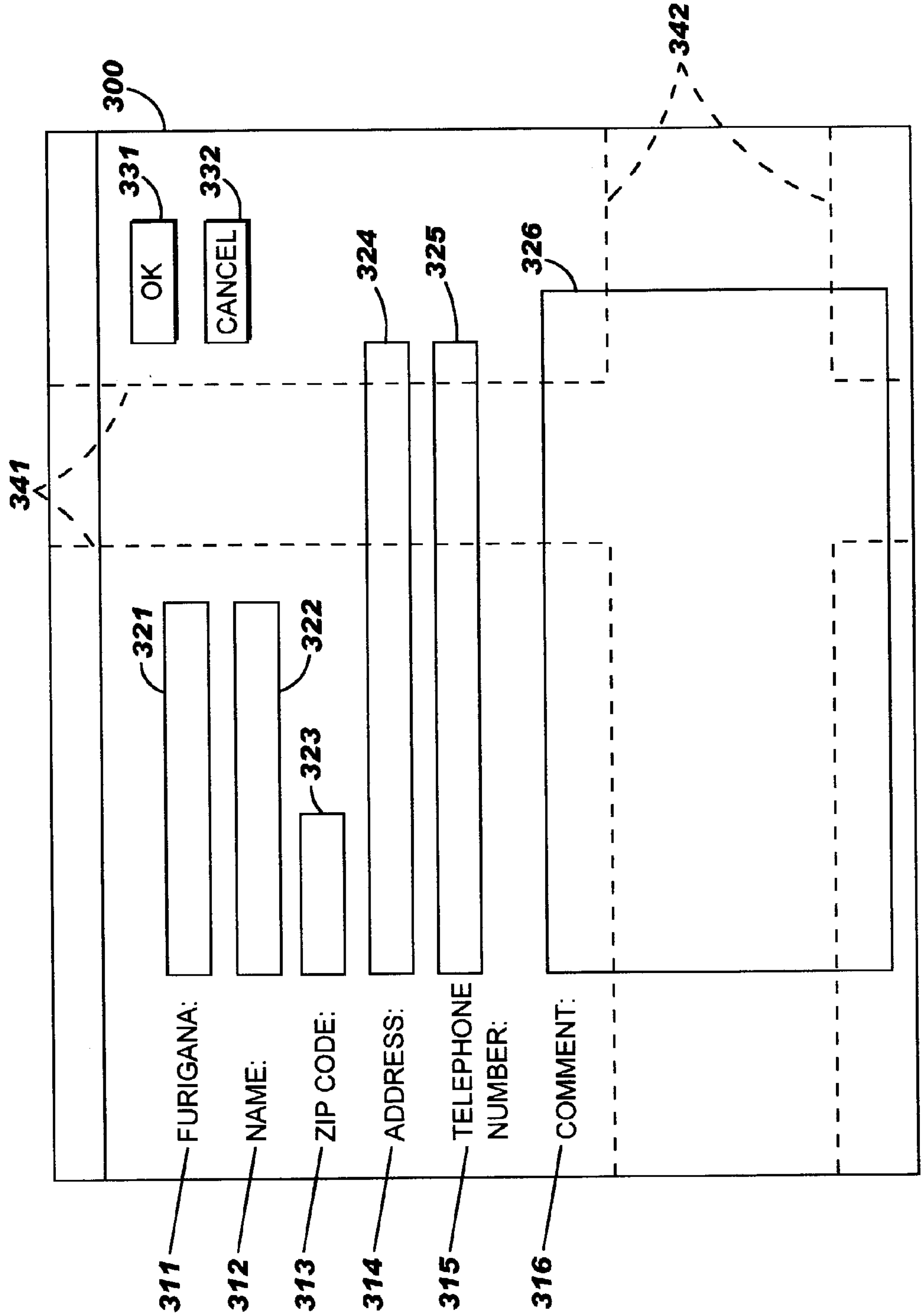
FIG. 4 shows an expanded state of the designed screen of FIG. 3.

FIG. 4 shows an expanded state of the designed screen of FIG. 3.

Referring to FIG. 4, the designed screen has been extended in both directions. This is indicated on the basis of the transformation assist lines 341 and 342. That is, relative to the width (horizontal direction) of the container 300, the designed screen is transformed to expand to both sides of the transformation assist line 341 with the transformation assist line 341 as a border. Similarly, relatie to the height (vertical direction) of the container 300, the designed screen is transformed to expand to the both sides of the transformation assist line 342 with the transformation assist line 342 as the border. In other words, in four regions surrounded with a frame line of the container 300 and the transformation assist lines 341 and 342, display states of the GUI parts are not changed, and the GUI parts are transformed such that an expanded gap among the respective regions due to the expansion of the container 300 is filled.

Accordingly, in FIG. 3, the designed image divided into four partitions (regions) by the transformation assist lines 341 and 342. The arrangements and the sizes of the GUI parts are then changed depending on which partition they are arranged in.

The labels 311–316 and the input fields 321–323 are positioned in a left upper partition in FIG. 3, and thus arranged having the same sizes at the same positions as they had before the transformation. The buttons 331 and 332 are positioned in a right upper partition and are moved to the right in response to the expansion of the container 300 on the basis of the transformations assist line 341 (moved to the right relative to the left upper vertex (the origin) of the container 300). The input fields 324 and 325, which span the left upper and right upper partitions, expand in the width (W) direction in response to the transformation of the container 300 based on their location relative to the transformation assist line 341. In addition, the input field 326, which spans all four partitions, expands in size in both the width (W) and height (H) directions in response to the transformation of the container 300 based on their positions relative to the transformation assist lines 341 and 342.

As described above, the invention makes it possible to make an intuitive decision as to which GUI parts should be moved or transformed based on the transformation of the designed screen and how they should be changed, by deciding the positions to set the transformation assist lines 341 and 342 in the designed screen. Thus, the screen designer does not need to understand this cumbersome and complicated task.

In the examples as shown in FIGS. 3 and 4, the movement and the transformation of the GUI parts are controlled with the two transformation assist lines 341 and 342, the transformation assist line 342 being in the horizontal direction and the transformation assist line 341 in the vertical direction. However, it is also possible to use a larger number of transformation assist lines to control the movement and the transformation of the GUI parts.

Figure 5:
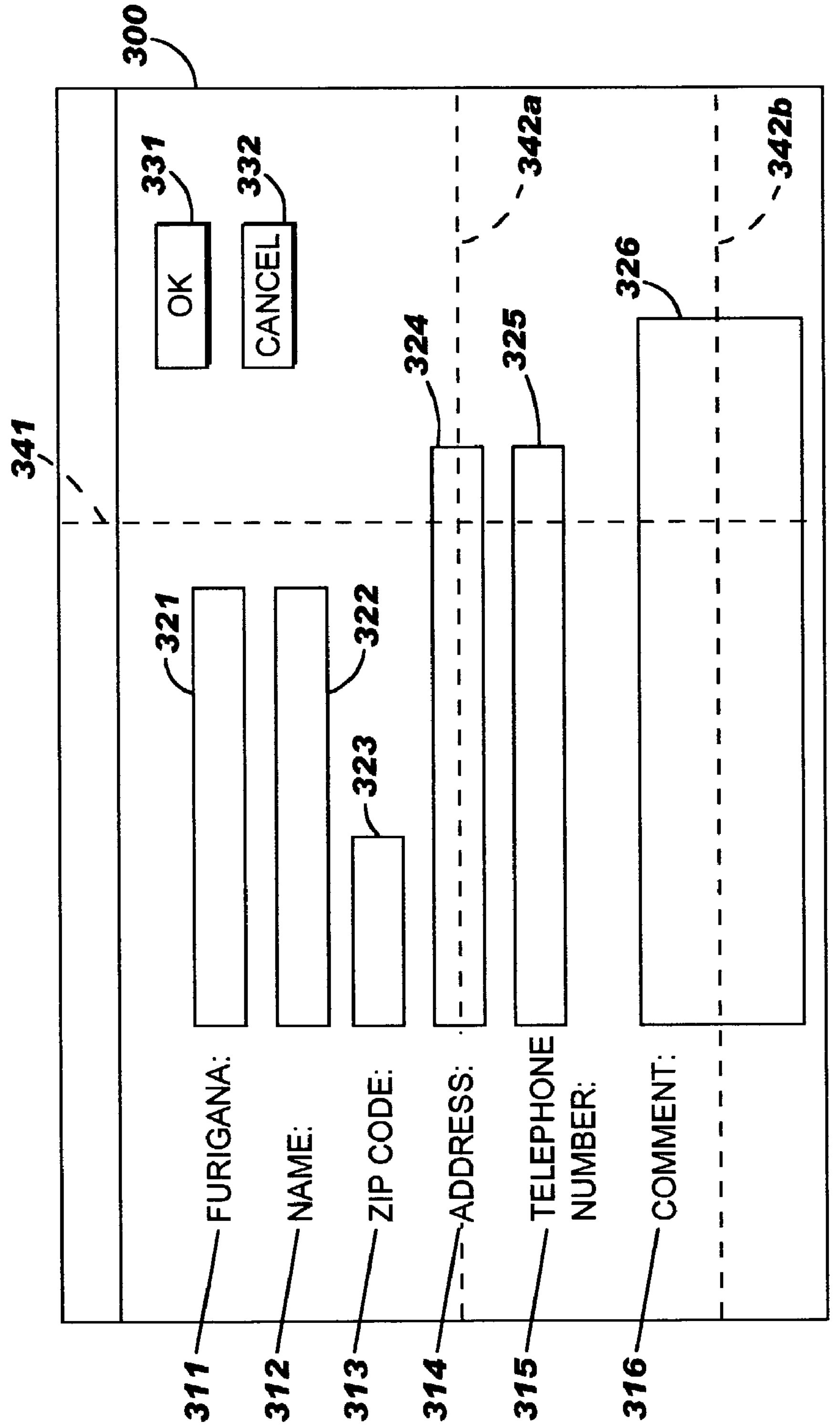
FIG. 5 shows a state in which two transformation assist lines in the horizontal direction and one transformation assist line in the vertical direction are set, with respect to the designed screen similar to FIG. 3.
Figure 6:
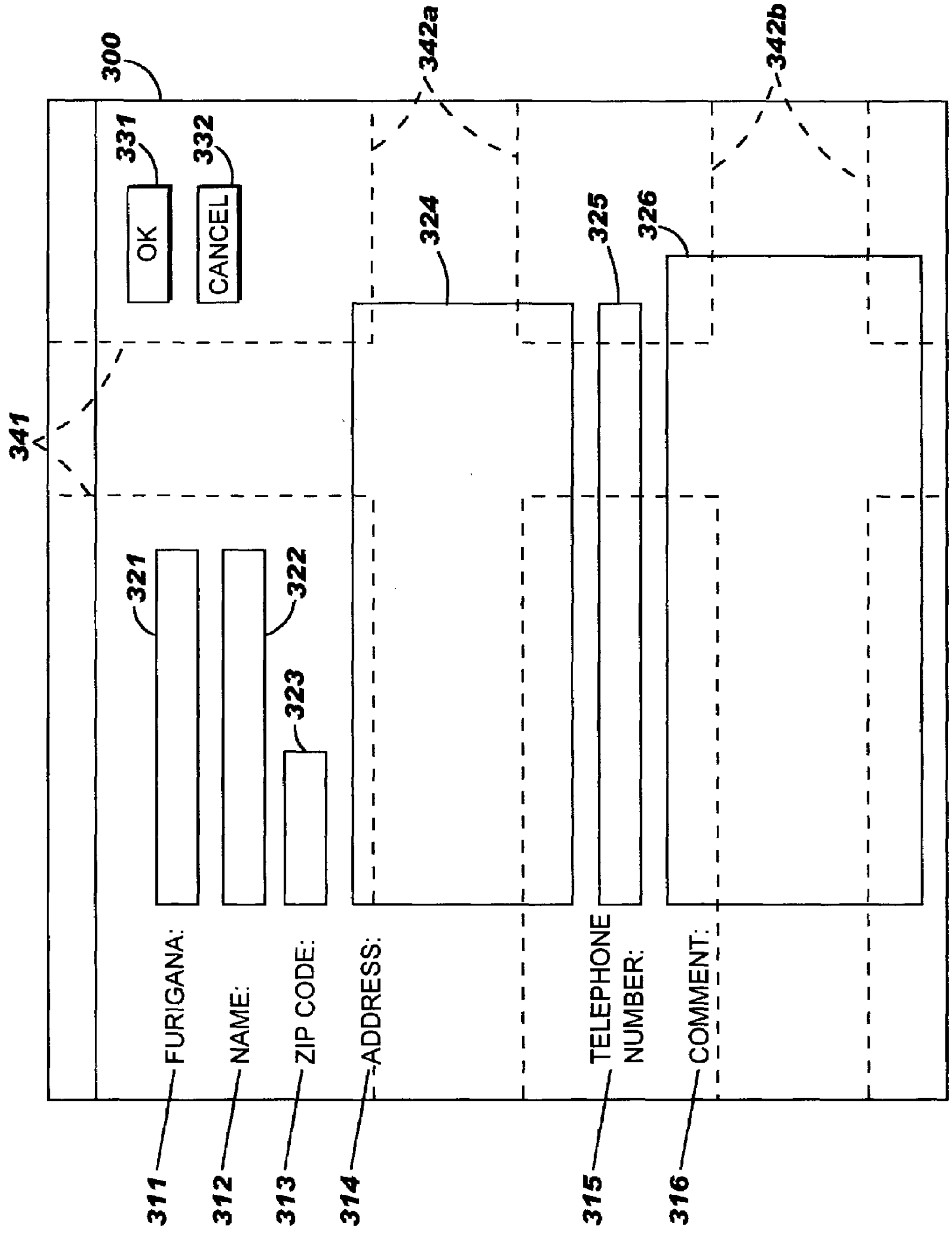
FIG. 6 shows the expanded state of the designed screen of FIG. 5.

FIG. 5 shows a designed screen in which two horizontal transformation assist lines 342*a* and 342*b* and one vertical transformation assist line 341 are set with respect to the designed screen. FIG. 6 shows the expanded state of the designed screen of FIG. 5 when expansion occurrs in both the H and W directions.

Comparing FIGS. 5 and 6, the designed screen is transformed to expand in the horizontal direction to both sides of the transformation assist line 341 with the transformation assist line 341 as the border. The designed screen is transformed to expand in the vertical direction to both sides of each of the transformation assist lines 342*a* and 342*b* with the two transformation assist lines 342*a* and 342*b* as the borders. Expansion is by equal distances to both sides of the transformation assist line 341, with the total expansion being equal to the amount of horzontal expansion. Expansion about each of the transformation assist lines 342*a* and 342*b* is equal to half of the total vertical expansion of the designed screen, with expansion being equal on both sides of the original location of each line 342*a* and 342*b*. Practically, whatever GUI part has one of the lines 341, 342*a* or 342*b* running through it is expanded.

Though the expansion in the horizontal direction is similar to that in the examples as shown in FIGS. 3 and 4, transformation in the vertical direction is different. There are the two transformation assist lines 342*a* and 342*b* so that the input fields 324 and 326 span the respective transformation assist lines 342*a* and 342*b*. Accordingly, both input fields 324 and 326 are expanded in the height (H) direction.

If a plurality of transformation assist lines are utilized, such as the transformation assist lines 342*a* and 342*b* of FIG. 5, it is possible to set a weight with respect to each transformation assist line and expand relative to each line depending on the weight. Alternatively, a value of the change in the size of the container 300 is divided by the number of the transformation assist lines as shown in the example illustrated in FIGS. 5 and 6 and may be assigned as the variation. In the present embodiment, the latter control is performed.

It should be noted that, referring to FIG. 5, the label 314 spans the transformation assist line 342*a*, and the rectangle forming the label 314 also extends in the height (H) direction in the state shown in FIG. 6. Since the rectangle of the label 314 has the same color as that of the container 300, this may not be visually determined in FIG. 6. However, by having specified a position for drawing strings to be "pulled up", the label 314 may be displayed being pulled up as shown in FIG. 6. In addition, since it is not preferable to change the size of the label due to its usage for displaying the strings, the display may be controlled not to change the size of the label but only to move the label on the basis of the left upper vertex. This would be most useful when the color of the container 300 and label are not the same.

Figure 7:
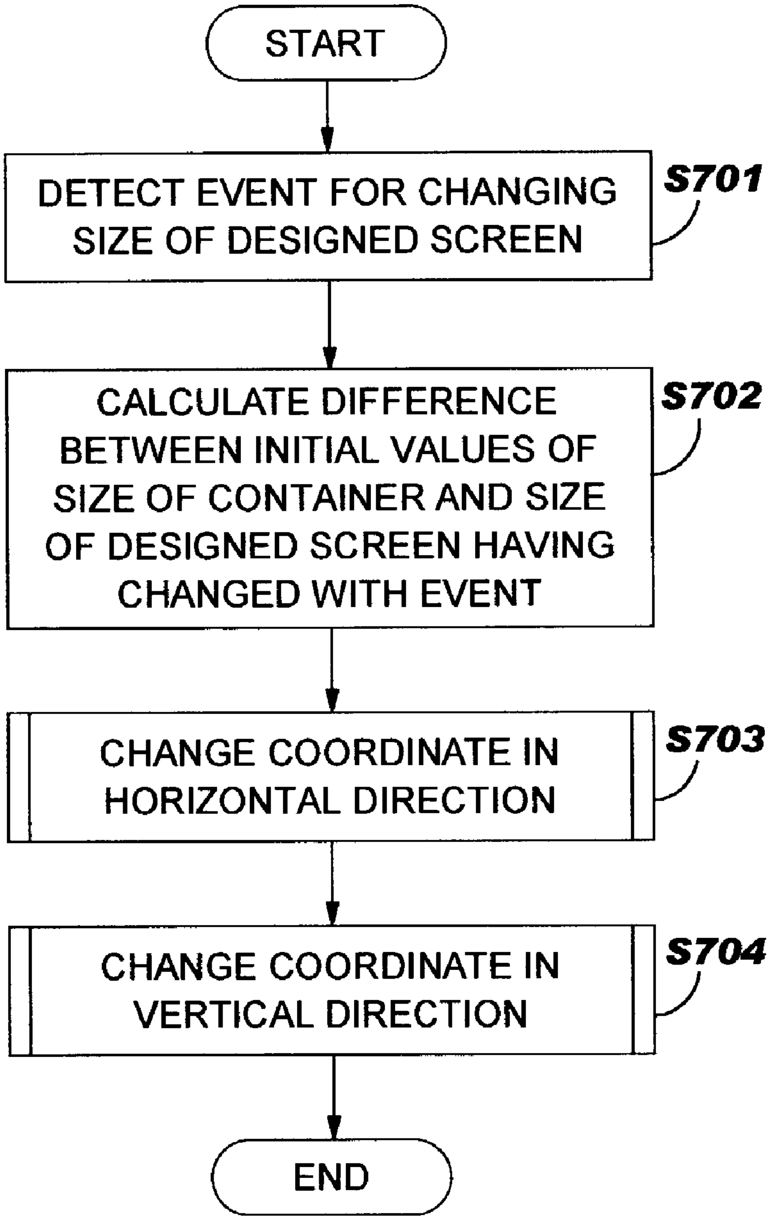
FIG. 7 is a flowchart for explaining a process for changing the size of the designed screen in the present embodiment.

FIG. 7 is a flowchart for explaining the process for changing the size of the designed screen in the present embodiment.

In the present embodiment, as the basic information relating to the designed screen, the designed screen in the case of the smallest size is previously generated, and set values in the case are stored in the basic information storage section 30. Then depending on the size of the designed screen having changed, on the basis of the information stored in this basic information storage section 30, the GUI parts are rearranged and changed in their sizes. That is, even if the designed screen expanded to some extent is transformed to reduce in the size, the designed screen is recalculated in the new size based on the set values in the case of the smallest size. Having the set values in the case of the smallest size as the basis, the transformation of the designed screen may always be treated as the expansion in the vertical direction or the horizontal direction, thereby the process may be simplified.

As shown in FIG. 7, first the event detection section 60 detects the event for changing the size of the designed screen, and notifies the arrangement control section 20 of that (step 701). This event occurs, for example, with a user's operation of dragging the frame line of the designated screen (container 300) by means of a pointing device such as the mouse to change the size of the designated screen or transform it.

When this event is detected, the arrangement control section 20 reads the initial values (W, H) of the size of the container 300 from the basic information storage section 30, and calculates the difference between the initial values and the size data (W, H) of the designed screen having changed with the detected event (that is, the variation with respect to the initial values) (Step 702).

Then, based on the calculated difference, coordinate data (XYWH) for denoting the position and the size is changed with respect to the GUI part within the container 300 (Steps 703 and 704). It should be noted that changing of the coordinate in the horizontal direction (Step 703) and changing of the coordinate in the vertical direction (Step 704) are similar processes, and either of them may be performed first.

Figure 8:
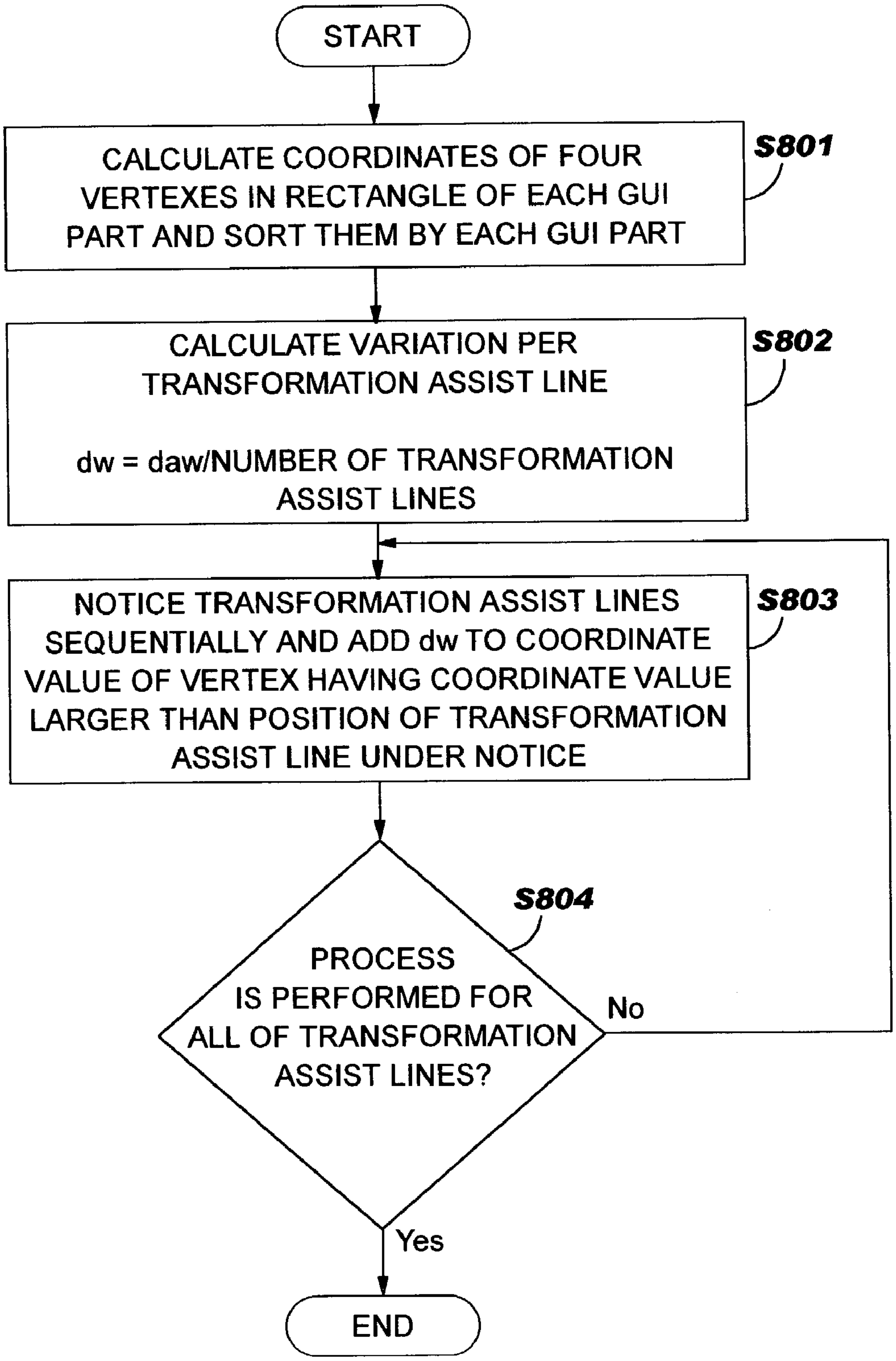
FIG. 8 is a flowchart for explaining a process for changing coordinates in FIG. 7 in detail.

FIG. 8 is a flowchart for explaining the process for changing the coordinates in Steps 703 and 704 in FIG. 7 in detail.

Referring to FIG. 8, the arrangement control section 20 first reads the initial values (XYWH) of the position and the size of each GUI part from the basic information storage section 30, and calculates the coordinates of the four vertexes in the rectangle of each GUI part to sort them by each GUI part (step 801). Then in addition, the position of the transformation assist line (the X coordinate or the Y coordinate) is also read and obtained from the basic information storage section 30.

Next, the variation per transformation assist line is calculated (Step 802). Providing that the variation to be calculated is dw, and the variation in the size of the container 300 calculated in step 702 of FIG. 7 is daw, it is calculated with an expression as follows:

$$dw = daw/\text{the number of the transformation assist lines}$$

Next, the arrangement control section 20 notices the respective transformation assist lines sequentially to compare the coordinates of the four vertexes in each GUI part obtained at step 801 with the position of the transformation assist line under the notice. Then the vertex having a coordinate value larger than the position of the above described transformation assist line is further increased by the value dw calculated at step 802 (Steps 803 and 804).

If the process of step 803 is performed for all of the transformation assist lines, the process is completed (step 804).

The above described process from step 801 through step 804 is performed with respect to the horizontal direction (step 703) and the vertical direction (step 704) respectively.

Next, given some specific values, the processes as shown in FIGS. 7 and 8 will be described.

FIG. 9 illustrates the data with respect to the initial values of the size of the container 300, the positions and the sizes of the GUI parts, and the positions of the transformation assist lines, which are stored in the basic information storage section 30. In addition, FIG. 10 shows a predetermined data changed (in which the data denoted in bold characters are the changed data) by transforming the designed screen generated based on the data as shown in FIG. 9 (that is, the designed screen displayed with the smallest size on the display section 10). Though not particularly specified here, for units of these data, similar units as in the case of ordinary image data may be used such as dot, inch and millimeter.

It should be noted that the data as shown in FIG. 9 corresponds to the designed screen as shown in FIG. 3, and the data as shown in FIG. 10 corresponds to the designed screen as shown in FIG. 4. That is, the screen management section 40 of the present embodiment manages the designed screen of FIG. 3, based on the data of FIG. 9 read from the basic information storage section 30 and stored in the arrangement information storage section 50, and manages the designed screen of FIG. 4 based on the data of FIG. 10 stored in the arrangement information storage section 50 after the operation for the transformation.

Referring to the data as shown in FIG. 9, the container 300 is 560 in the width direction (W) and 370 in the height direction (H), and with the coordinates to be set within this container 300, the positions (the positions of the left upper vertexes in the respective rectangles) of six labels 311–316, six input fields 321–326 and two buttons 331 and 332 are specified. In addition, the positions of the transformation assist lines 341 and 342 are specified with the X coordinates and the Y coordinates.

Here, it is assumed that the size of the designed screen (container 300) is changed. Here, it is assumed that the designed screen is expanded to 740 in the width direction (W) and to 520 in the height direction (H) (see FIG. 10).

As described with the flowchart of FIG. 7, when this event occurs, the event detection section 60 notifies the arrangement control section 20 (step 701), and the arrangement control section 20 read the initial values (W, H) of the size of the container 300 as shown in FIG. 9 from the basic information storage section 30. Then, the difference daw between the initial values and the size of the designed screen having changed is calculated (step 702). In the examples of FIGS. 9 and 10, the designed screen is increased by 180 (740–560) in the width direction and by 150 (520–370) in the height direction.

Based on this transformation, next the arrangement control section 20 changes the coordinate data of each GUI part (Steps 703 and 704).

First, in the horizontal direction, when the position of the transformation assist line 341 is read from the basic information storage section 30, the position is the X coordinate value of [380], so any coordinate values larger than this value are examined. Then, since the input field 324 has the position of the left side (X coordinate value) of [140] and [280] in the width (W), the position of the right side is [420 (=140+280)] which is larger than the X coordinate value of the transformation assist line 341. Then, this coordinate value is changed (Steps 801–803).

Since the number of the transformation assist line 341 in the vertical direction is one, the variation in the coordinate value dw is 180 (180/1). Therefore, the position of the right side of the input field 324 is 600 (420+180). Thereby, as the information for arranging the input field 324 in the container 300, it is changed to 460 (600−140) in the width (W).

Similarly, the input field 325 is changed to 460 (600−140) in the width (W). In addition, since the input field 326 has the initial value of the right side of 460 (140+320), it is changed to 640 (460+180), thereby as the information for arranging it in the container 300, it is changed to 500 (640−140) in the width (W).

Furthermore, the button 331 has the position of the left side of 440 and it is larger than the X coordinate value of the transformation assist line 341. Naturally, since the right side of 530 (440+90) is also larger than the X coordinate value of the transformation assist line 341, these coordinate values of the both sides are changed.

With the process similar as the above described process, the position of the left side is changed to 620 (440+180), and the position of right side is changed to 710 (530+180). The width of the rectangle of the button 331 is not changed since its both sides are changed by the same values, thereby as the information for arranging the button 331 in the container 300, as shown in FIG. 10, only the position of the left side (X coordinate value) is changed to 620.

Similarly, for the button 332, the X coordinate value is changed to 620.

Next, in the vertical direction, when the position of the transformation assist line 342 is read from the basic information storage section 30, the position is the Y coordinate value of 260, so any coordinate values larger than this value are examined. Then, since the input field 324 has the position of the upper side (Y coordinate value) of 200 and 100 in the height (H), the position of the lower side is 300 (200+100) which is larger than the Y coordinate value of the transformation assist line 342. Then, this coordinate value is changed (Steps 801–803).

Since the number of the transformation assist line 342 in the vertical direction is one, the variation in the coordinate value dw is 150 (150/1). Therefore, the position of the right side of the input field 324 is 450 (300+150). Thereby, as the information for arranging the input field 324 in the container 300, it is changed to 250 (450−200) in the width (W) as shown in FIG. 10.

It should be noted that, in the above described operation, if the designed screen is changed, based on the set values in the case of the smallest size, the designed screen in the new size is recalculated, however on the contrary, on the basis of the set values in the largest size available to display on the display section 10, it is possible to recalculate the designed screen in the new size such that the designed screen is reduced from the set values in the largest size. Also, the designed screen of a predetermined size may be assigned as a base size, and on the basis of the set value in this case, it is possible to calculate the designed screen of another size. However in this case, it is necessary to provide an appropriate limit so as not to permit a specification of the size unavailable for the arrangement as a result, such as reducing the GUI part having the width of only 10, by 15.

Next, a variation of the present embodiment will be described.

First, in the above described embodiment, in principle, the GUI part distant from the transformation assist lines 341 and 342 is moved depending on its position, and the GUI part under the transformation assist lines 341 and 342 is transformed to extend to the both sides of the above described transformation assist lines 341 and 342. However, with respect to the individual GUI part, as explained for the process with respect to the input field 324 in the variations as shown in FIGS. 5 and 6, it is possible to limit the transformation such that the GUI part is only moved but not changed in the size, depending on a position of a predetermined base point (for example, the left upper vertex in the rectangle forming the GUI part).

Figure 11:
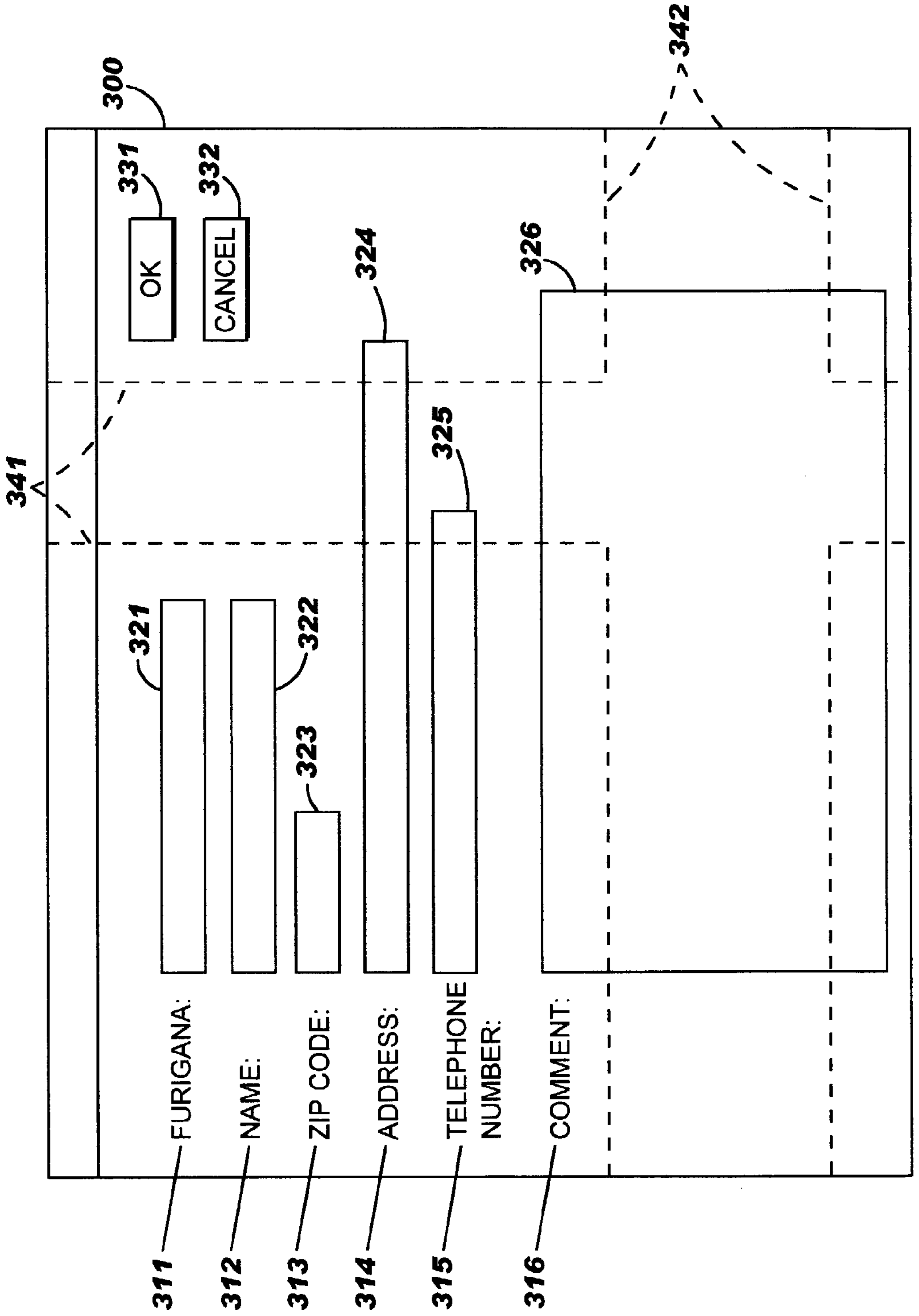
FIG. 11 shows the expanded state of the designed screen by limiting transformation with respect to an input field in the designed screen similar to FIG. 3.

FIG. 11 shows the designed screen in the case where the transformation is limited in such a way with respect to the input field 325 in the state of FIG. 3, and the size is changed similarly to FIG. 4.

As shown in FIG. 11, among the input fields 324, 325 and 326 under the transformation assist line 341, the input fields 324 and 326 are extended to the both sides of the transformation assist line 341, while the input field 325 is not transformed.

In addition, each of the transformation assist lines 341 and 342 may also be set as a set of a plurality of segments having different setting positions (the X coordinates or the Y coordinates), instead of each continuous line.

Figure 12:
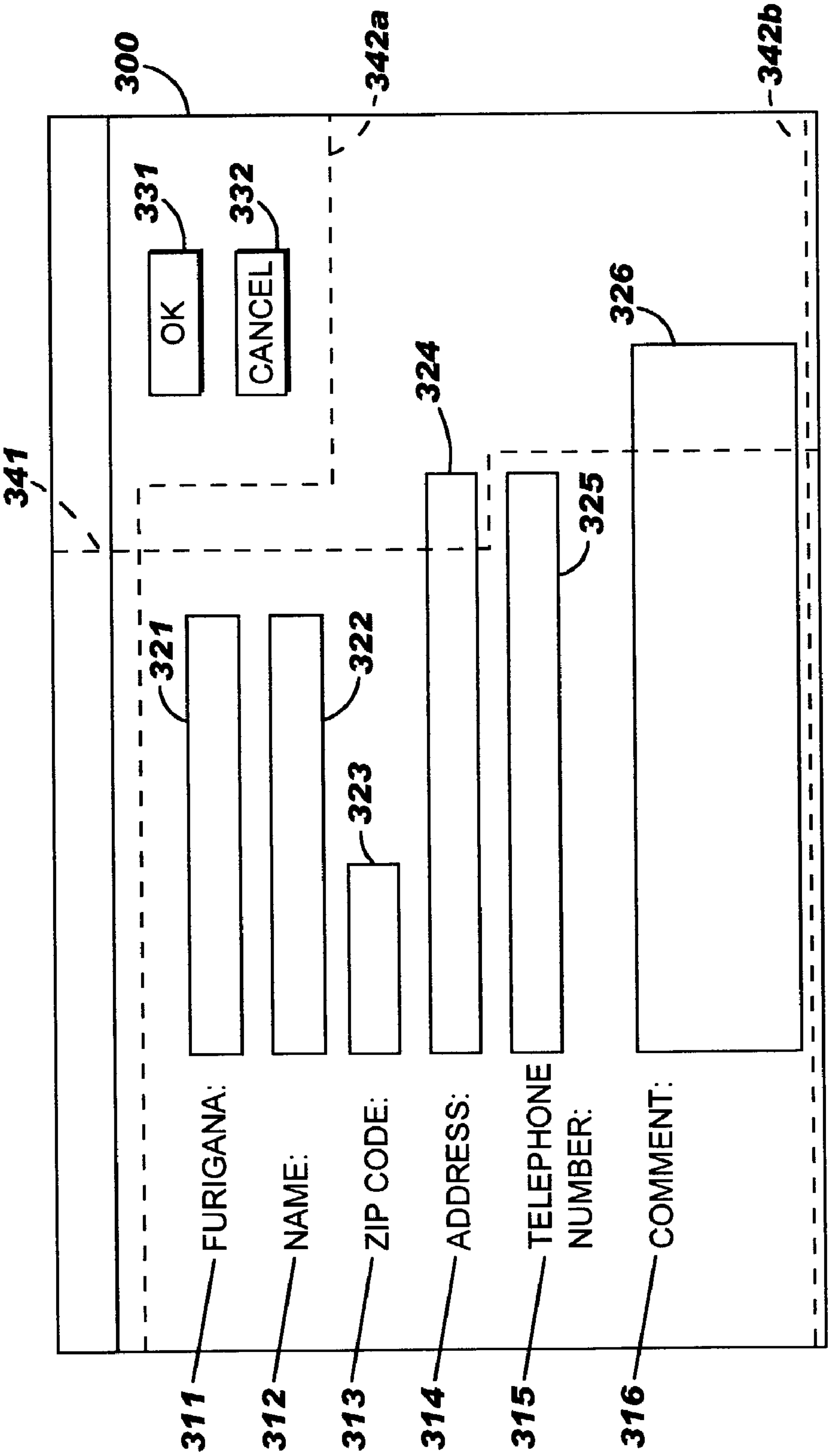
FIG. 12 shows a state in which the transformation assist lines having different setting positions in the middle of the lines are set with respect to the designed screen similar to FIG. 3.

FIG. 12 shows a state in which the transformation assist lines having the different setting positions in the middle of the lines are set with respect to the designed screen similar to FIG. 3. In addition, FIG. 13 shows the expanded state of the designed screen of FIG. 12.

Referring to FIG. 12, in the transformation assist lines 341 and 342*a*, the setting positions (the X coordinates, the Y coordinates) are changed in the middle of the lines. When this designed screen is expanded as shown in FIG. 13, first in the horizontal direction, the buttons 331 and 332 are moved and the input fields 324 and 326 are transformed similarly to the case of FIG. 4, however the input field 325 is not transformed because the transform assist line 341 is diverted therefrom as shown in FIG. 12.

In addition, in the vertical direction, the labels 311–316 and the input fields 321–326 are centered, which are positioned between the upper transformation assist line 342*a* and the lower transformation assist line 342*b*, and the buttons 331 and 332 are not moved because the transform assist line 342*a* is diverted therefrom.

Figure 13:
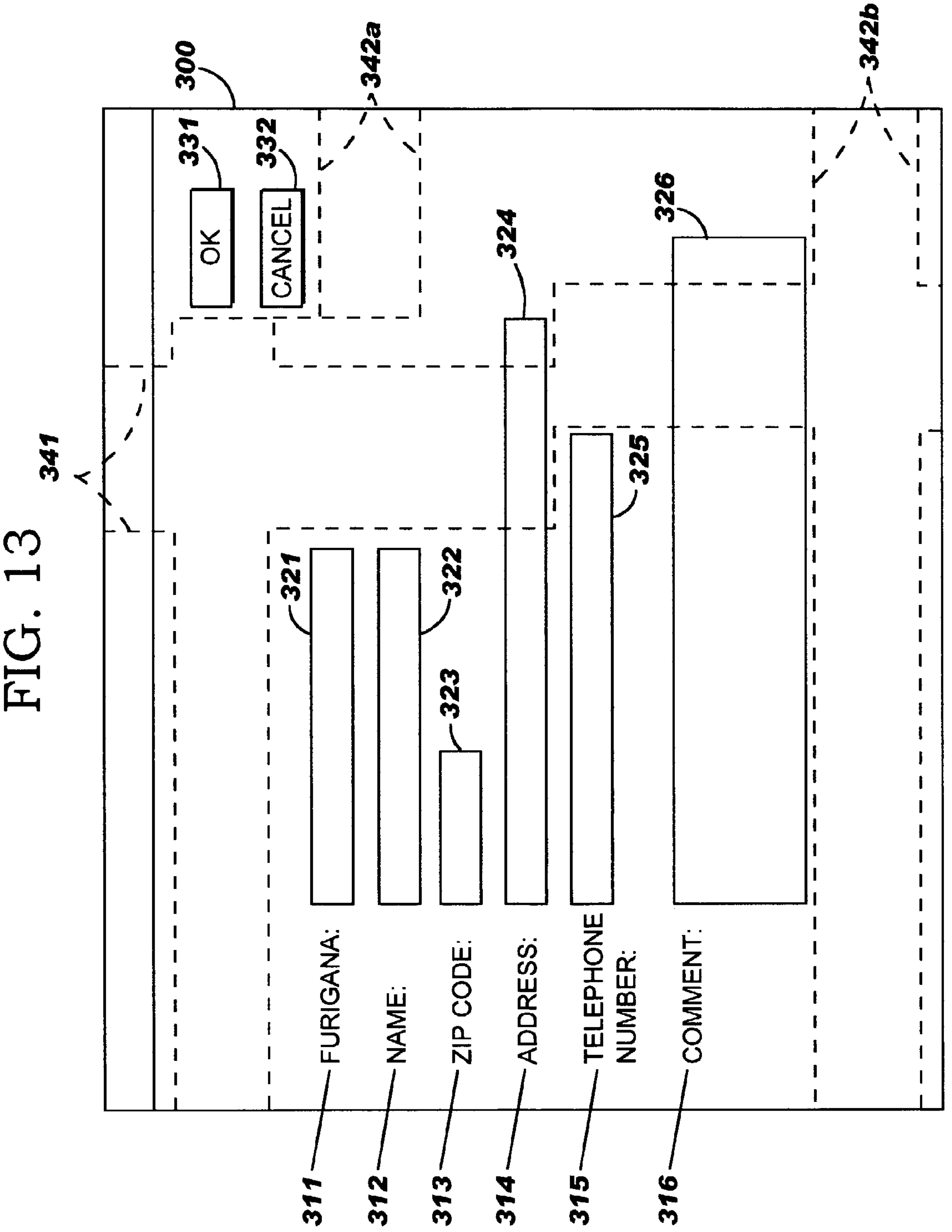
FIG. 13 shows the expanded state of the designed screen of FIG. 12.
Figure 14:
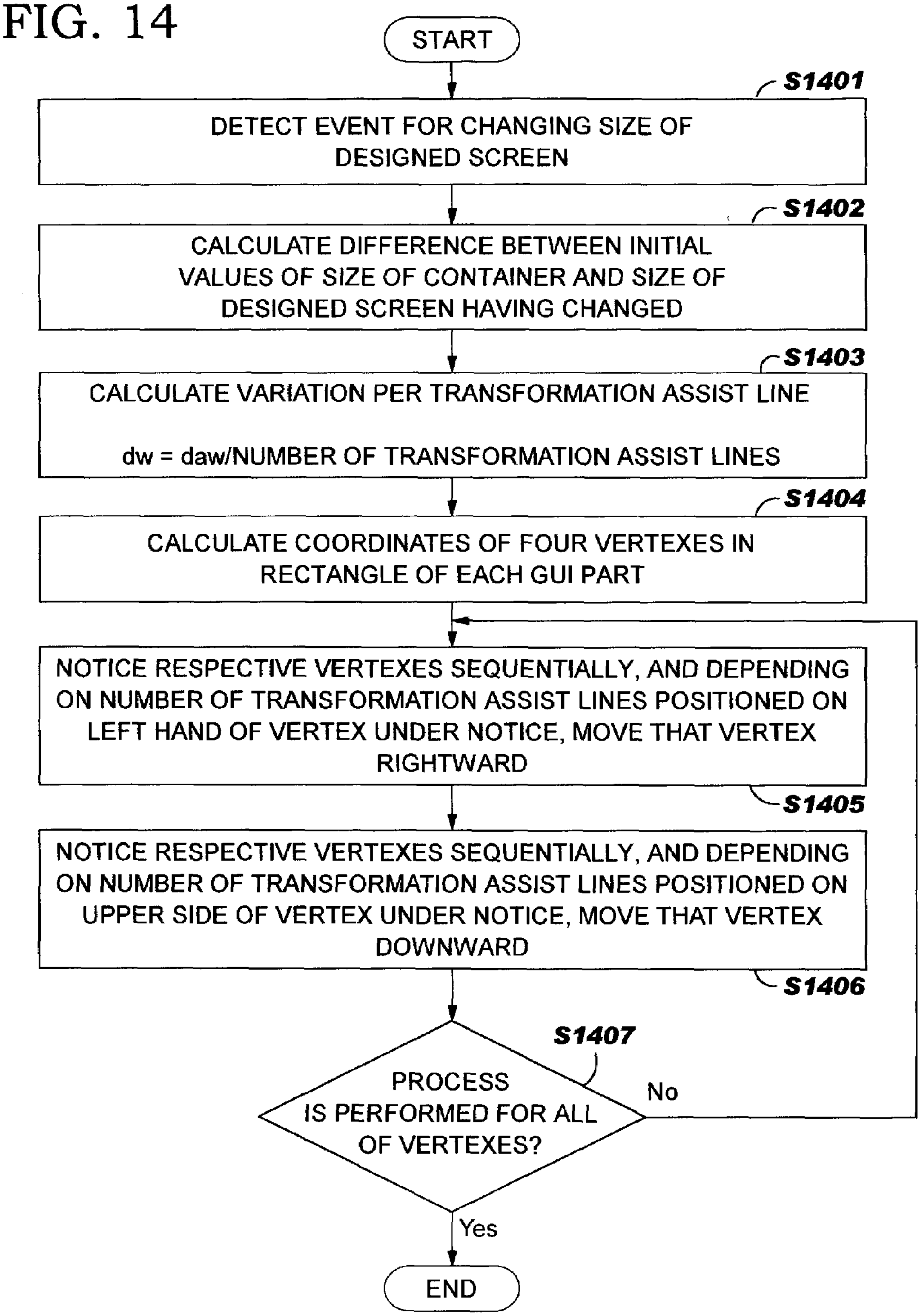
FIG. 14 is a flowchart for explaining the process for changing the size of the designed screen in the case of setting the transformation assist lines having the setting positions which are changed in the middle of the lines.
Figure 15:
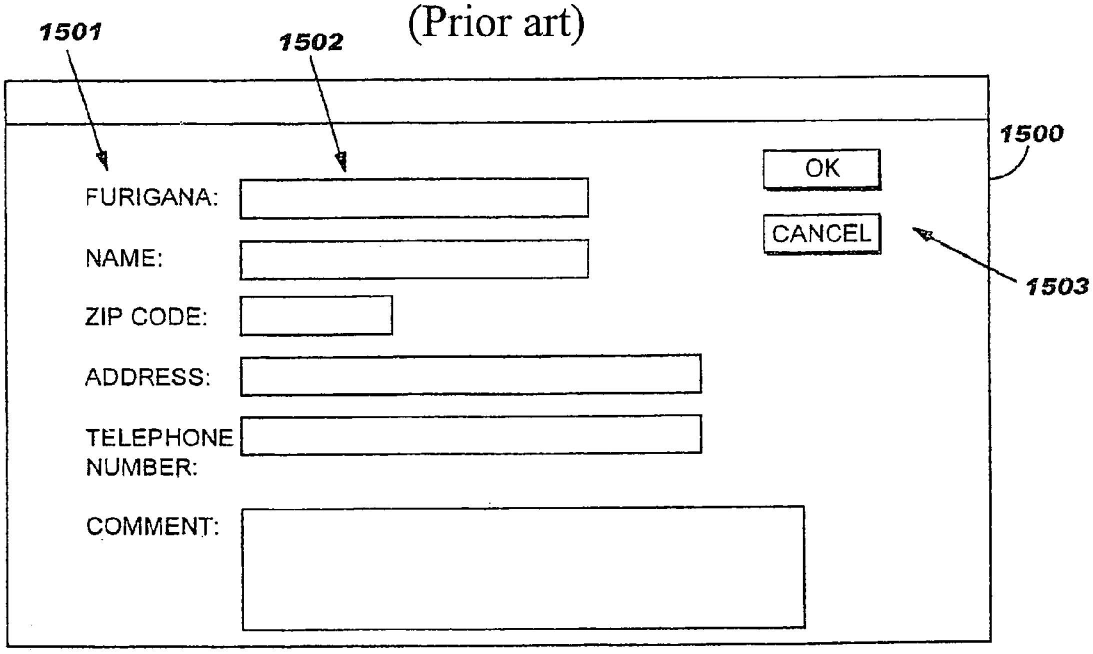
FIG. 15 (Prior art)
FIG. 15 shows an example of an input screen by means of a combination of labels and the input fields.

FIG. 14 is a flowchart for explaining the process for changing the size of the designed screen in the case of setting the transformation assist lines having the setting positions which are changed in the middle of the lines, as shown in FIGS. 12 and 13.

In FIG. 14, first when the event detection section 60 detects the event for changing the size of the designed screen (step 1401), the arrangement control section 20 is notified of that by the event detection section 60, reads the initial values (W, H) of the size of the container 300 from the basic information storage section 30, and calculates the difference between the initial values and the size data (W, H) of the designed screen having changed with the detected event (that is, the variation with respect to the initial values) (step 1402). Then the variation per transformation assist line is calculated (step 1403).

Next, the arrangement control section 20 reads the initial values (XYWH) of the position and the size of each GUI part from the basic information storage section 30, and calculates the four coordinates in the rectangle forming each GUI part to be arranged within the container 300 (step 1404).

Then, the arrangement control section 20 notices respective vertexes sequentially to move them based on the transformation assist lines. That is, depending on the number of the transformation assist lines having the X coordinate value smaller than (positioned on the left hand of) that of the vertex under the notice, the X coordinate value of the above described vertex is changed to move the above described vertex rightward (step 1405). Further depending on the number of the transformation assist lines having the Y coordinate value smaller than (positioned on the upper side of) that of the above described vertex, the Y coordinate value of the above described vertex is changed to move the above described vertex downward (step 1406).

If the processes of steps 1405 and 1406 are performed for all of the vertexes, this process is completed (step 1407).

Since the above described process may change and move the coordinate values for each vertex in the rectangle forming the GUI part, it may be possible to realize any complex transformation of the designed screen.

It should be noted that, as described above, if the setting positions of the transformation assist lines 341 and 342 may be changed in the middle of the lines, some statuses may occur due to the setting of the transformation assist lines 341 and 342, in which the positions of the transformation assist lines 341 and 342 are changed in the middle of the rectangle forming the GUI part, or in which the transformation assist lines 341 and 342 are complicated with each other so that the GUI part may not be moved or transformed appropriately. If such statuses occur, it is possible to accommodate such statuses by moving the GUI part giving priority to the left upper vertex without transforming the GUI part, for example.

The above described embodiment is described for the case where the embodiment is used in a stage of designing the screen composed by arranging the small rectangle (each GUI part) in the large rectangle (container 300), in order to design the screen by variously changing the size of the container 300. However, of course, the display control method according to the present embodiment may be generally applicable to various screens to be displayed on the display unit of the computer.

As described above, according to the present invention, it is possible to improve the productivity on a task for redesigning the screen depending on the change in the display size of the screen, in the screen design of a user interface.

Also, according to the present invention, it is possible to realize the display control method of the screen in which intuitively selected display sizes or arrangements may be easily reflected on the actual screen.

The invention claimed is:

1. In a computing environment, a method for controlling changes to a screen displayed on a display device, the screen including a container and Graphical User Interface (GUI) parts arranged in said container, said method comprising the steps of:

detecting an event which causes a size change of said container;

changing data relating to a size of said container, according to said event;

changing GUI data relating to a position and a size of the GUI parts, based on a transformation assist line that is preset at a predetermined position on said container, and wherein the GUI data is changed only for GUI parts that are intersected inside their boundary lines by the transformation assist line; and updating the screen displayed on the display device to reflect the changed data for the container and the position and the size of the GUI parts.

2. The method according to claim 1, wherein said step of changing data relating to the GUI parts further comprises:

changing the position data of said GUI parts depending on their positional relation to said transformation assist line, and changing the size data of said GUI parts, on which said transformation assist line is set, depending on a variation in the size of said container in a direction orthogonal to said transformation assist line.

3. The method of claim 1, wherein the transformation assist line is a non-linear plurality of segments, such that a higher level of granularity is provided for selecting which GUI parts are size-affected by the size change of the container.

4. The method of claim 1, wherein a plurality of transformation assist lines adjust the position data and the size data of the GUI parts.

5. The method of claim 4, wherein each of the transformation assist lines are weighted, and wherein GUI parts intersected by different transformation assist lines are moved and resized differently according to a different weighting value for each transformation assist line.

6. The method of claim 1, wherein the predetermined position of the transformation assist line remains at a fixed distance from a moved side of the container, wherein the fixed distance remains the same before and after the moved side of the container is moved.

7. A system comprising:

means for detecting an event which causes a size change of a container, wherein the container is displayed on a screen displayed on a display device, and wherein the contain surrounds multiple Graphical User Interface (GUI) parts that are arranged in the container;

means for changing data relating to a size of the container, according to the event;

means for changing GUI data relating to a position and a size of the GUI parts, based on a transformation assist line that is preset at a predetermined position on the container, and wherein the GUI data is changed only for GUI parts that are intersected inside their boundary lines by the transformation assist line; and means for updating the screen displayed on the display device to reflect the changed data for the container and the position and the size of the GUI parts.

8. The system of claim 7, wherein the means for changing data relating to the GUI parts further comprises:

means for changing the position data of the GUI parts depending on their positional relation to the transformation assist line, and means for changing the size data of the GUI parts, on which the transformation assist line is set, depending on a variation in the size of the container in a direction orthogonal to the transformation assist line.

9. The system of claim 8, wherein the transformation assist line is a non-linear plurality of segments, such that a higher level of granularity is provided for selecting which GUI parts are size-affected by the size change of the container.

10. The system of claim 7, wherein a plurality of transformation assist lines adjust the position data and the size data of the GUI parts.

11. The system of claim 10, wherein each of the transformation assist lines are weighted, and wherein GUI parts intersected by different transformation assist lines are moved and resized differently according to a different weighting value for each transformation assist line.

12. The system of claim 7, wherein the predetermined position of the transformation assist line remains at a fixed distance from a moved side of the container, wherein the fixed distance remains the same before and after the moved side of the container is moved.

13. A computer-readable medium encoded with a computer program, the computer program including instructions that, when executed, are configured for:

detecting an event which causes a size change of a container, wherein the container is displayed on a screen displayed on a display device, and wherein the contain surrounds multiple Graphical User Interface (GUI) parts that are arranged in the container;

changing data relating to a size of the container, according to the event;

changing GUI data relating to a position and a size of the GUI parts, based on a transformation assist line that is preset at a predetermined position on the container, and wherein the GUI data is changed only for GUI parts that are intersected inside their boundary lines by the transformation assist line; and updating the screen displayed on the display device to reflect the changed data for the container and the position and the size of the GUI parts.

14. The computer-readable medium of claim 13, wherein the instructions for changing data relating to the GUI parts are further configured for:

changing the position data of the GUI parts depending on their positional relation to the transformation assist line, and changing the size data of the GUI parts, on which the transformation assist line is set, depending on a variation in the size of the container in a direction orthogonal to the transformation assist line.

15. The computer-readable medium of claim 13, wherein the transformation assist line is a non-linear plurality of segments, such that a higher level of granularity is provided for selecting which GUI parts are size-affected by the size change of the container.

16. The computer-readable medium of claim 13, wherein a plurality of transformation assist lines adjust the position data and the size data of the GUI parts.

17. The computer-readable medium of claim 16, wherein each of the transformation assist lines are weighted, and wherein GUI parts intersected by different transformation assist lines are moved and resized differently according to a different weighting value for each transformation assist line.

18. The computer-readable medium of claim 13, wherein the predetermined position of the transformation assist line remains at a fixed distance from a moved side of the container, wherein the fixed distance remains the same before and after the moved side of the container is moved.

* * * * *